(12) United States Patent
Hollis

(10) Patent No.: US 7,631,784 B2
(45) Date of Patent: Dec. 15, 2009

(54) ATHLETIC HYDRATION SYSTEM FOR BICYCLISTS

(76) Inventor: Todd Jonathan Hollis, 715 N. Negley Ave., Pittsburgh, PA (US) 15206

( * ) Notice: Subject to any disclaimer, the term of this patent is extended or adjusted under 35 U.S.C. 154(b) by 735 days.

(21) Appl. No.: 11/446,456

(22) Filed: Jun. 2, 2006

(65) Prior Publication Data

US 2007/0278273 A1 Dec. 6, 2007

(51) Int. Cl.
*B67D 5/64* (2006.01)
(52) U.S. Cl. .................. 222/175; 224/414; 224/926
(58) Field of Classification Search ............. 222/175, 222/129, 135, 132, 144.5; 224/414, 926, 224/148.1, 148.2, 148.4, 148.7
See application file for complete search history.

(56) References Cited

U.S. PATENT DOCUMENTS 3,411,534 A * 11/1968 Rose ..................... 137/595
5,115,952 A * 5/1992 Jenkins ................... 224/414
6,749,090 B2 * 6/2004 Bailey .................... 222/175
6,953,135 B2 * 10/2005 Litton et al. ............. 224/414

* cited by examiner

*Primary Examiner*—Kevin P Shaver
*Assistant Examiner*—Robert K Nichols, II
(74) *Attorney, Agent, or Firm*—The Webb Law Firm

(57) ABSTRACT

The present invention provides an athletic hydration system for cyclists which includes up to four containers having inverted fluid-filled bottles contained therein, in which the containers are placed either within the frame of a bicycle or at the rear of the bicycle behind the bicycle seat. A system of valves determines whether a cyclist drinks from one, two, three or all four fluid-filled bottles simultaneously. The athletic hydration system is hygienic, versatile and flexible, and provides adequate hydration over extended periods of time in which quick removal and installation of hydration products are possible by the cyclist while maintaining the speed, cadence and aerodynamic posture of the cyclist.

19 Claims, 7 Drawing Sheets

ATHLETIC HYDRATION SYSTEM FOR BICYCLISTS

BACKGROUND OF THE INVENTION

1. Field of the Invention

The present invention relates to the field of bicycles and bicycling and, more particularly, to an aerodynamically compatible hydration system for bicyclists in which a variety of liquids may be dispensed to the cyclist over an extended period of time.

2. Description of Related Art

It is the practice of cyclists to carry water or other beverages to quench thirst and rehydrate the body. The provision of liquids is important to compensate for the body liquids dispensed by cyclists, especially during racing events or long rides. The traditional method of hydration for cyclists has been either to grasp at cups of liquids provided at stations along a race course or to drink from one or two water bottles that are held in cages attached to the bicycle and that periodically require replacement. However, both methods present a problem for cyclists as they attempt to maintain their speed by minimizing the slowing effect resulting from raising the upper torso to drink from an open cup or a bottle. Another problem encountered by cyclists is the need to reach down to remove and replace the bottle, which can compromise control of the bicycle and presents the risk of dropping the bottle. Additionally, a principal shortcoming of traditional water bottles is that they lack sufficient liquid capacity to provide adequate hydration over an extended period, which means the cyclist must stop to refill the bottle(s). The need for larger amounts of water has been addressed, with partial success, by hydration packs that may be worn on the back of the bicyclist like a backpack. However, hydration packs are bulky and limit maneuverability, are very difficult to clean, especially if filled with a sticky sports drink, and thus are likely to harbor bacteria, mold and other unwanted substances.

Various attempts to overcome the aforementioned hydration problems encountered by bicyclists have been made, as disclosed in U.S. Pat. Nos. 4,095,812; 4,274,566; 5,024,358; 5,115,952; 5,788,134; 6,264,166; 6,401,997; and 6,543,660. One example of the prior art is shown by the Gomber bike mounted hydration system, which consists of one or two bottles of fluid connected to tubing and valves that terminate in a handlebar-mounted pump, which allows the bicyclist to pump water into the mouth by hand squeezing the pump. This system, however, also presents with several problems: it is an open system in which replacement of a bottle requires that the cyclist stop to open the bottle in order to place tubing within the bottle; as an open system, the bottle is subject to becoming infected with bacteria or other microorganisms; and the system is restricted to the use of no more than two bottles of liquid and to only one type of liquid at a time.

There exists a need, therefore, for a hydration system for cyclists which provides a variety of fluids and adequate hydration over an extended period of time, and at the same time allows cyclists to maintain their speed and aerodynamic posture while quickly removing and reinstalling new hydration products to provide an almost endless supply of hydration.

SUMMARY OF THE INVENTION

The present invention fulfills this need by providing an athletic hydration system for cyclists that is hygienic and versatile, and provides adequate hydration over extended periods of time in which quick removal and installation of hydration products are possible by the cyclists while maintaining the speed, cadence and aerodynamic posture of the cyclists.

In one embodiment of the present invention, the athletic hydration system is comprised of at least two containers which can be placed either within the frame of a bicycle or at the rear of the bicycle behind the bicycle seat. One end of each container has an opening defined therein and the other end has a sleeve-shaped outlet fitting port therein, wherein the open end of the container is capable of having inserted therein an open, inverted fluid-filled bottle.

The hydration system also includes at least two container tubing members, in which each container tubing member has a first end and a second end, wherein the first end of the container tubing member inserts over the sleeve-shaped outlet fitting port of a container.

The hydration system further includes a container valve, preferably a three-way valve, having at least two inlet ports and at least one outlet port, in which the container valve has a rotatable lever that rotates 180 degrees around an axis, wherein the second end of one container tubing member inserts over one of the inlet ports of the container valve and the second end of the other container tubing member inserts over the other inlet port of the container valve. When the lever is rotated to a particular position, it opens or closes the inlet and outlet ports of the container valve to allow fluid to flow from one or both inverted bottles in the two containers through the tubing members.

The hydration system still further provides a main valve having at least two inlet ports and at least one outlet port, in which the main valve also has a rotatable lever capable of rotating 180 degrees around an axis, which rotates in at least three positions to open or close the inlet and outlet ports of the main valve. The main valve has attached to the inlet ports at least one main valve inlet tubing member, in which the main valve inlet tubing member has a first end and a second end, wherein the first end of the main valve inlet tubing member inserts over the inlet port of the main valve and the second end inserts over the container valve outlet port. The main valve has attached to the outlet valve a main valve outlet tubing member having a first end and a second end, in which the first end inserts over the outlet port of the main valve and the second end is positioned adjacent to the center of the handlebar of the bicycle and terminates in a push-pull valve which can be inserted into the mouth of a cyclist. When the lever of the main valve is rotated to a particular position, it opens or closes the inlet port of the main valve to allow fluid to flow from the container valve into the main valve outlet tubing member. Thus, depending on the position of the lever of the container valve and the position of the lever of the main valve, the cyclist is able to drink from either bottle or from both bottles simultaneously.

In another embodiment, the present invention is comprised of four containers, two bottom containers that fit within the frame of a bicycle and two back containers that are located at the rear of the bicycle behind the bicycle seat. Each of the containers is configured as described above.

Additionally, this embodiment of the present invention includes a main valve and two container valves: a bottom valve and a back valve. The three valves are configured as described above, and preferably are three-way valves. Each of the two bottom containers has a tubing member, in which one end of the tubing member inserts over the sleeve-shaped outlet fitting port of the container and the other end of the tubing member inserts over one of the inlet ports of the bottom valve. Each of the two back containers also has a tubing member, in which one end of the tubing member inserts over the sleeve-shaped outlet fitting port of the container and the other end of the tubing member inserts over one of the inlet ports of the back valve. Rotation of the lever on either of the bottom valve or the back valve to an open or closed position opens or closes the inlet and outlet ports of the valves. When in the open position, fluid flows from the inverted bottles in the containers through the tubing members. The main valve has two main valve inlet tubing members. One end of one main valve inlet tubing member inserts over the inlet port of the main valve and the other end inserts in the bottom valve outlet port; and one end of the other inlet tubing member inserts over another inlet port of the main valve and the other end inserts in the back outlet port of the back valve. The main valve has attached to the outlet valve a main valve outlet tubing member having a first end and a second end, in which the first end inserts over the outlet port of the main valve and the second end is positioned adjacent to the center of the handlebar of the bicycle and terminates in a push-pull valve which can be inserted into the mouth of a cyclist. When the lever of the main valve is rotated to a particular position, this opens or closes one or both ports of the main valve to allow fluid to flow from either the bottom valve, the back valve, or from both bottom valve and back valve into the main three-way valve outlet tubing member. Thus, depending on the position of the levers of the bottom container valve, the back container valve and the main valve, the cyclist is able to drink from one bottle, or has the option to drink from any two, three or four bottles simultaneously.

DETAILED DESCRIPTION OF THE INVENTION

Figure 1:
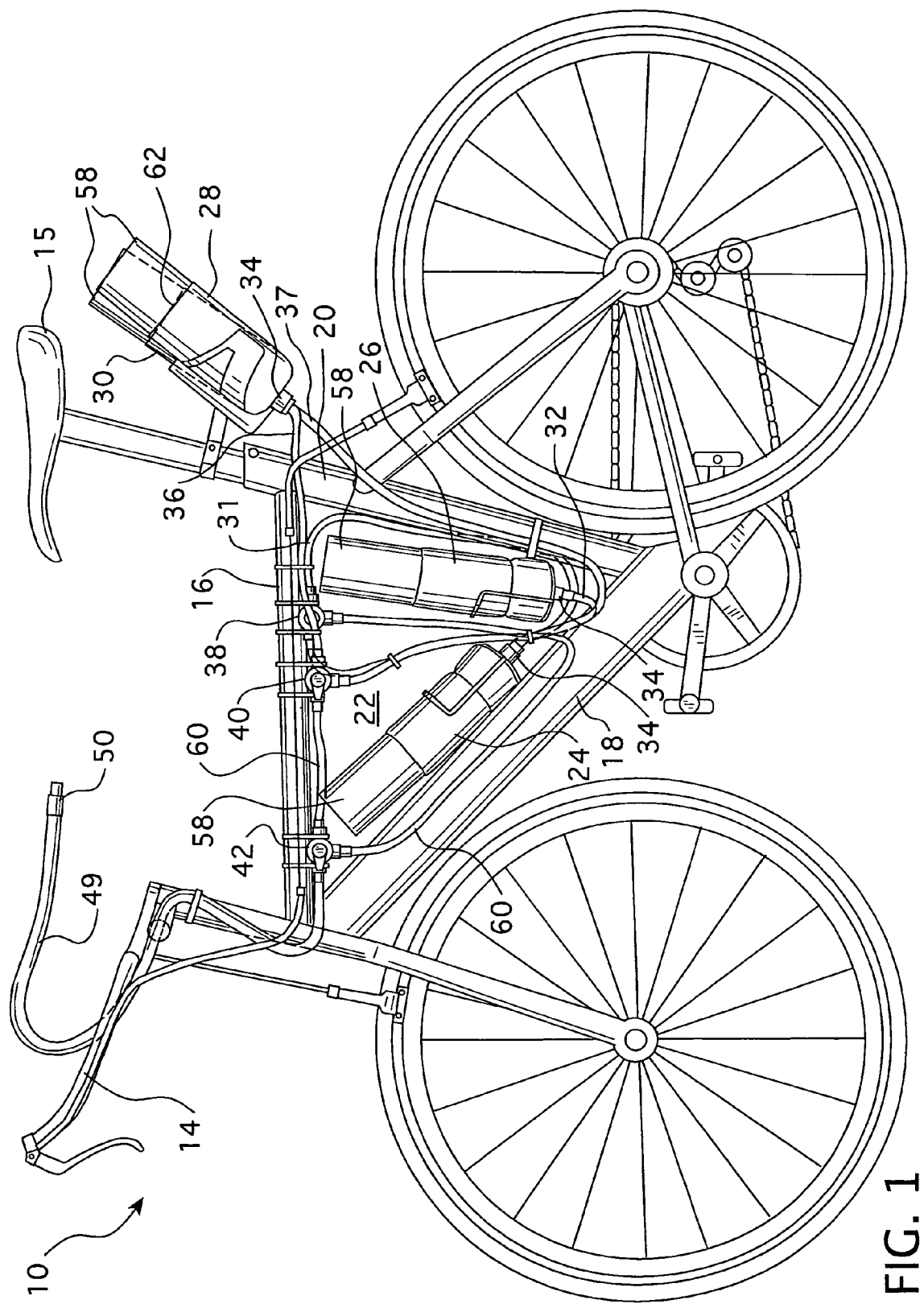
FIG. 1 is a left plan view of a bicycle showing the athletic hydration system of the present invention attached thereon.

A complete understanding of the present invention will be obtained from the following description taken in connection with the accompanying drawing figures, wherein like reference characters identify like parts throughout.

Figure 2:
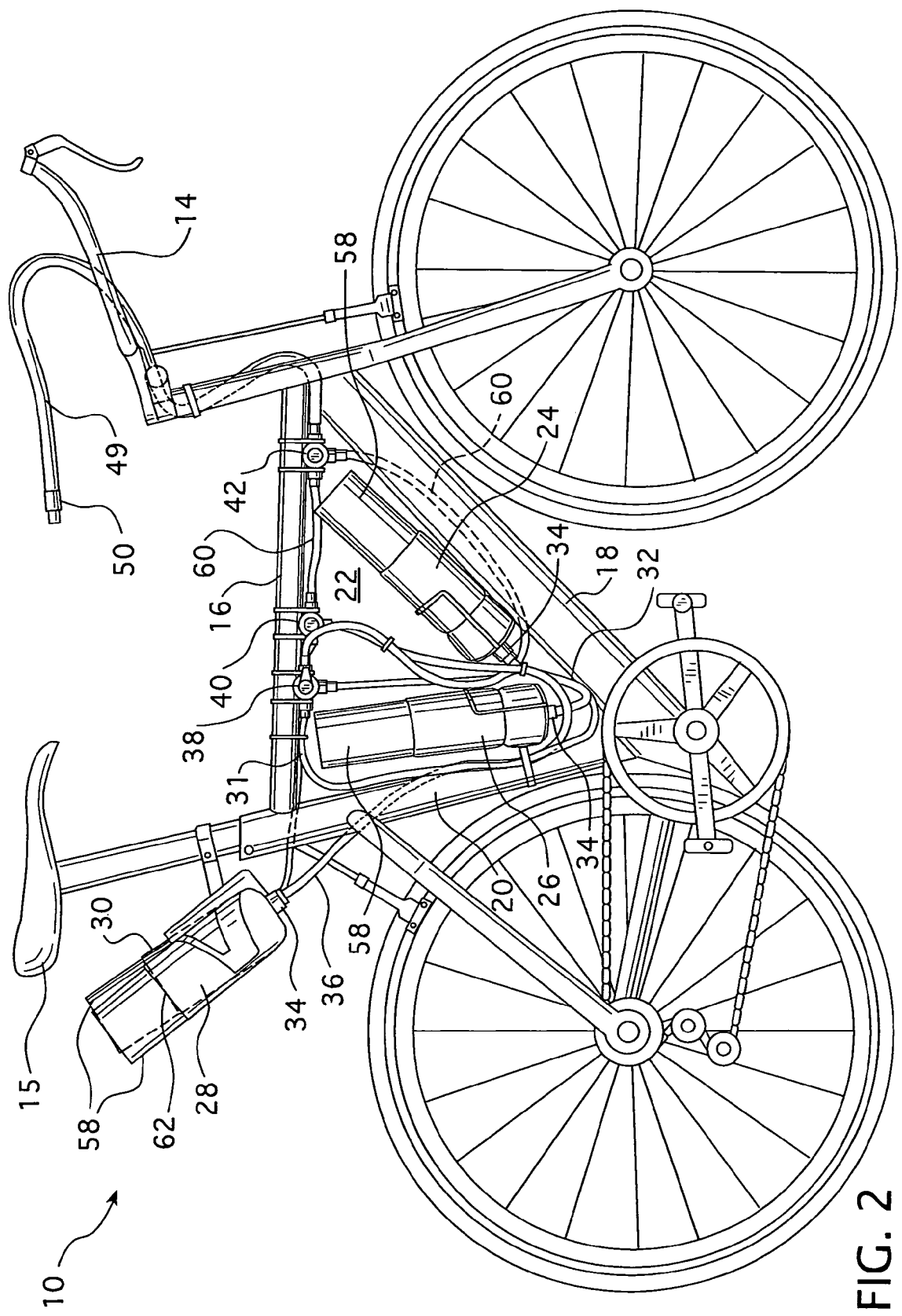
FIG. 2 is a right plan view of a bicycle showing the athletic hydration system of the present invention attached thereon.

In one embodiment of the present invention, as shown in FIGS. 1 and 2, the athletic hydration system is comprised of at least two containers which can be placed either at the bottom of a bicycle 10 within a triangle frame 22 of the bicycle 10 provided by a top tube 16, a down tube 18 and a seat tube 20 of the frame, or at the rear of the bicycle 10 behind a bicycle seat 15.

In a preferred embodiment of the present invention, as shown in FIGS. 1 and 2, the athletic hydration system is comprised of four containers: a first bottom container 24, a second bottom container 26, a first back container 28 and a second back container 30. At one end of each container there is an opening defined therein 62 and at the other end of each container there is a sleeve-shaped outlet fitting port 34 therein. The open end of each container 62 is capable of having inserted therein an open, inverted fluid-filled bottle 58. The containers can be fabricated from any suitable material, such as plastic.

Figure 3:
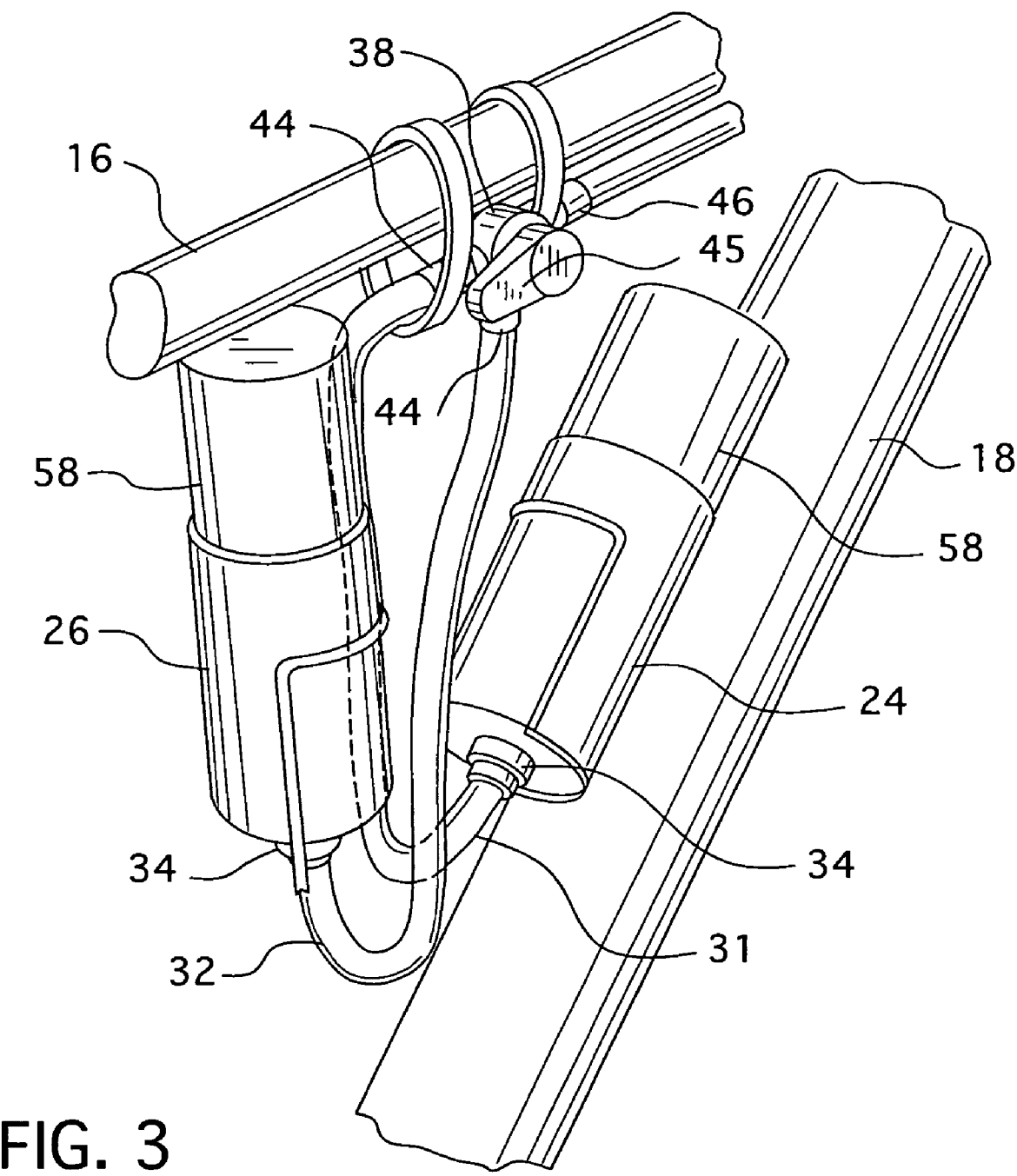
FIG. 3 is an enlarged perspective view of two bottom containers attached within the triangle of the frame of a bicycle, as well as the bottom valve, bottom valve inlet and outlet ports, and bottom inlet and outlet tubing members.

As shown in FIG. 3, a bottom three-way valve 38, which has two bottom inlet ports 44 and one outlet port 46, is connected to the bottom containers 24, 26 by a first bottom inlet tubing member 31 and a second bottom inlet tubing member 32, in which one end of each tubing member 31, 32 inserts over the sleeve-shaped outlet fitting port 34 and the other end inserts over one bottom inlet port 44. The tubing members can be fabricated from any suitable material, such as plastic. The bottom container valve 38 has a rotatable lever 45 that rotates 180 degrees around an axis. When the lever 45 of the bottom three-way valve 38 is rotated to one of three positions, it opens, closes or partially opens/closes the inlet ports 44 and outlet port 46 of the bottom container valve 38 to allow fluid to flow from one or both inverted bottles 58 in the two bottom containers 24, 26 through the tubing members 31, 32. As a non-limiting example, when the lever 45 is placed in position one, the horizontal inlet port 44 of the bottom three-way valve 38 opens and the vertical inlet port 44 of the bottom three-way valve 38 closes, thus allowing fluid to flow only from the first bottom container 24 through the tubing member 31 and through the horizontal inlet port 44. When the lever 45 is placed in position two, the horizontal inlet port 44 of the bottom three-way valve 38 closes and the vertical inlet port 44 of the bottom three-way valve 38 opens, thus allowing fluid to flow only from the second bottom container 26 through the tubing member 32 and through the vertical inlet port 44. When the lever 45 is placed in position three, both the horizontal inlet port 44 and the vertical inlet port 44 of the bottom three-way valve 38 opens, thus allowing fluid to flow through both the first bottom container 24 and the second bottom container 26 through both tubing members 31, 32 and through the horizontal and vertical inlet ports 44 of the bottom container three-way valve 38.

Figure 4:
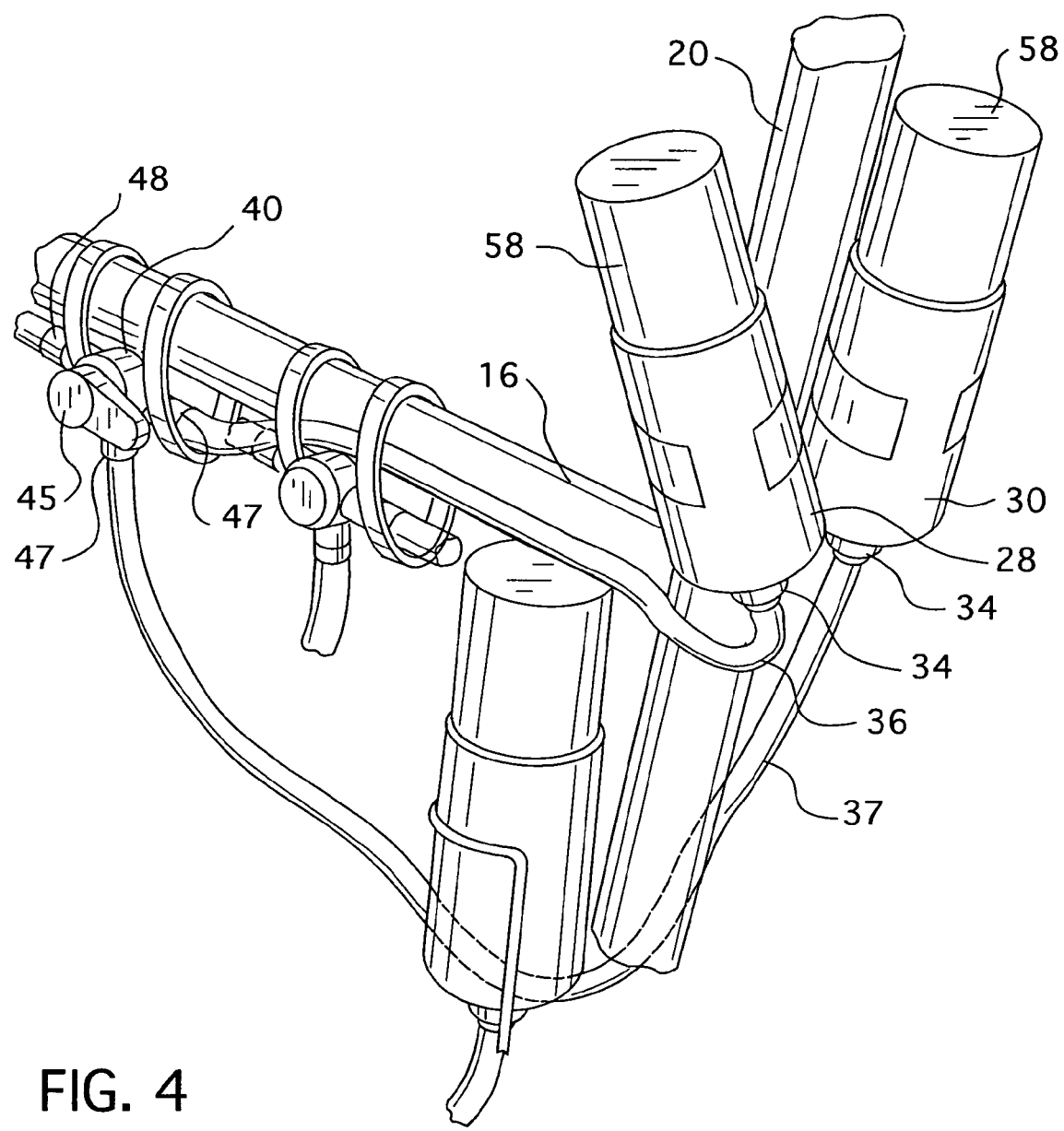
FIG. 4 is an enlarged perspective view of two back containers attached at the rear of a bicycle, as well as the back valve, back valve inlet and outlet ports, and back inlet and outlet tubing members.

As shown in FIG. 4, a back three-way valve 40, which has two back container inlet ports 47 and one outlet port 48, is connected to the back containers 28, 30 by a first back container inlet tubing member 36 and a second back container inlet tubing member 37. One end of each back tubing member 36, 37 inserts over the sleeve-shaped outlet fitting port 34 of each back container 28, 30 and the other end inserts over one back container inlet port 44. The back three-way valve 40 has a rotatable lever 45 that rotates 180 degrees around an axis. When the lever 45 of the back three-way valve 40 is rotated to one of three positions, it opens, closes or partially opens/closes the inlet ports 47 and outlet port 48 of the back three-way valve 40 to allow fluid to flow from one or both inverted bottles 58 in the two back containers 28, 30 through the back container tubing members 36, 37. As a non-limiting example, when the lever 45 is placed in position one, the horizontal inlet port 47 of the back three-way valve 40 opens and the vertical inlet port 47 of the back three-way valve 40 closes, thus allowing fluid to flow only from the first back container 28 through the tubing member 36 and through the horizontal inlet port 47. When the lever 45 is placed in position two, the horizontal inlet port 47 of the back three-way valve 40 closes and the vertical inlet port 47 of the back three-way valve 40 opens, thus allowing fluid to flow only from the second bottom container 30 through the tubing member 37 and through the vertical inlet port 47. When the lever 45 is placed in position three, both the horizontal inlet port 47 and the vertical inlet port 47 of the back three-way valve 40 opens, thus allowing fluid to flow through both the first back container 28 and the second back container 30 through both tubing members 36, 37 and through the horizontal and vertical inlet ports 47 of the back container three-way valve 40.

Figure 5:
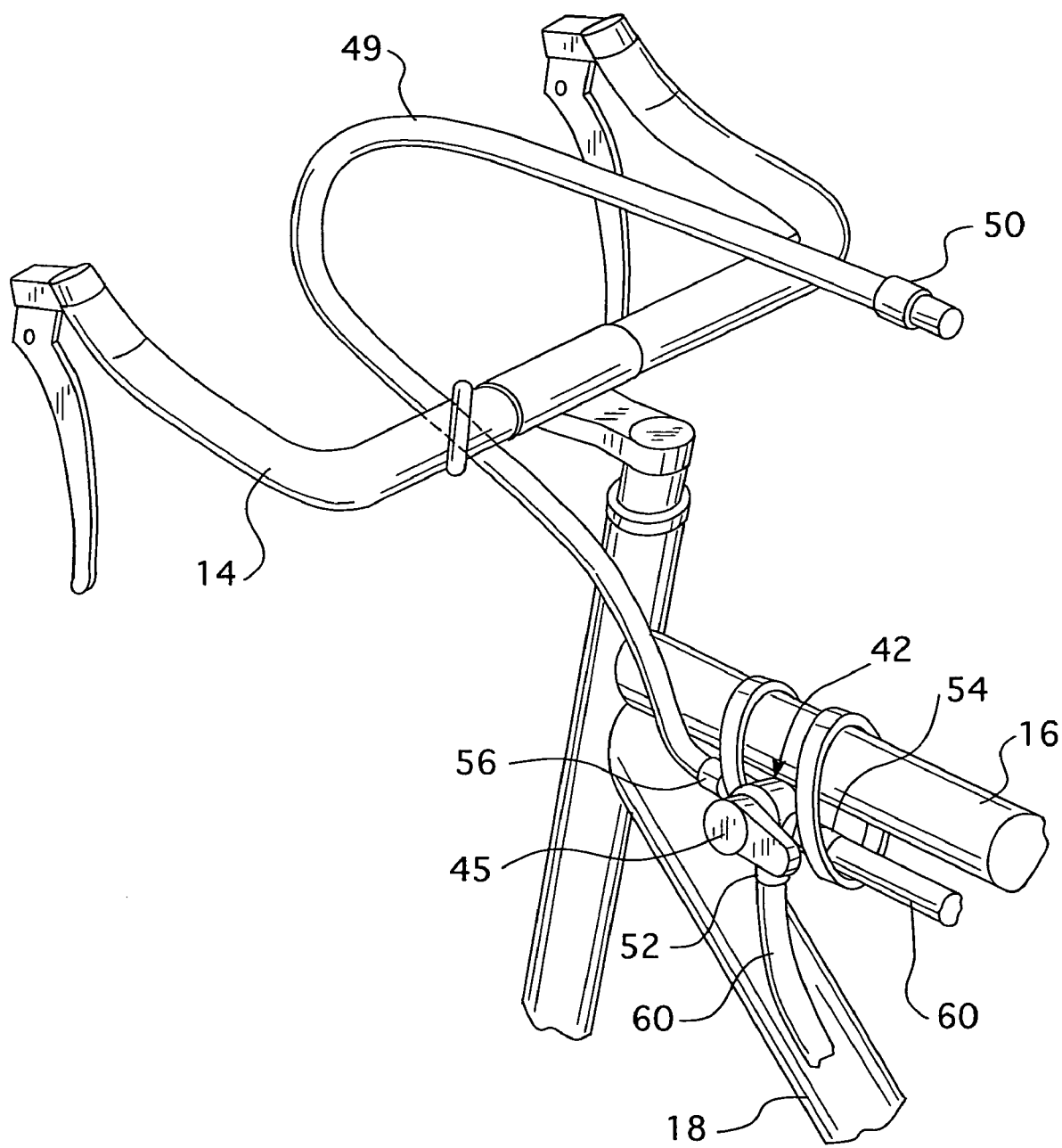
FIG. 5 is an enlarged perspective view of the main valve and the main valve inlet and outlet tubing members attached to the inlet and outlet ports of the main valve.

FIG. 5 shows a main three-way valve 42 having a bottom container inlet port 52, a back container inlet port 54 and one outlet port 56. The main valve 42 has a rotatable lever 45 capable of rotating 180 degrees around an axis, which rotates in at least three positions to open or close the inlet 52, 54 and outlet ports 56 of the main valve 42. Attached to the inlet ports 52, 54 of the main valve 42 is a main valve inlet tubing member 60. Each main valve inlet tubing member 60 has a first end and second end, wherein the first end of one main valve inlet tubing member 60 inserts over the bottom container inlet port 52 of the main valve 42 and the second end inserts over the bottom container valve outlet port 46. The first end of the other main valve inlet tubing member 60 inserts over the back container inlet port 54 of the main valve 42 and the second end inserts over the back container valve outlet port 48. The main valve 42 has attached to the outlet port 56 a main valve outlet tubing member 49 having a first end and a second end, in which the first end inserts over the outlet port 56 of the main valve 42 and the second end is positioned adjacent to the center of the handlebars 14 of the bicycle 10 and terminates in a push-pull valve 50 which can be inserted into the mouth of a cyclist. Optionally, the main valve outlet tubing member 49 is reinforced with an outer rubber sleeve. When the lever 45 of the main three-way valve 42 is rotated to one of three positions, it opens, closes or partially opens/closes the inlet ports 52, 54 to allow fluid to flow from either the bottom containers 24, 26 or the back containers 28, 30 and into the main valve outlet tubing member 49. As a non-limiting example, when the lever 45 is placed in position one, the horizontal inlet port 54 of the main three-way valve 42 opens and the vertical inlet port 52 of the main three-way valve 42 closes, thus allowing fluid to flow only from the back containers 28, 30 through the tubing members 36, 37, through the horizontal inlet port 54, through the outlet port 56 and into the main valve outlet tubing member 49. A cyclist accesses the fluid coming from the back containers by pulling the push-pull valve 50 outward with the mouth. When the lever 45 is placed in position two, the horizontal inlet port 54 of the main three-way valve 42 closes and the vertical inlet port 52 of the main three-way valve 42 opens, thus allowing fluid to flow only from the bottom containers 24, 26, through the tubing members 31, 32, through the vertical inlet port 52, through the outlet port 56 and into the main valve outlet tubing member 49. A cyclist accesses the fluid coming from the bottom containers by pulling the push-pull valve 50 outward with the mouth. When the lever 45 is placed in position three, both the horizontal inlet port 54 and the vertical inlet port 56 of the main three-way valve 42 opens, thus allowing fluid to flow through both the back containers 28, 30 and the bottom containers 24, 26 at the same time, through all four tubing members 31, 32, 36, 37, through the vertical inlet port 52, through the main valve outlet port 56 and into the main valve outlet tubing member 49. A cyclist accesses the fluid coming from both the bottom containers and the back containers by pulling the push-pull valve 50 outward with the mouth.

Therefore, depending on the individual positions of each lever of each of the three, three-way valves, the variety of drinking options made available to a cyclist by the present invention at any one time includes accessing fluid from one, two, three or all four containers simultaneously and in any combination. Thus, a cyclist has the option of placing different fluids in one or more containers and thus accessing a mixture of fluids. For example, and without limitation, the bottom containers can contain water and the back containers can contain a sports electrolyte drink. By positioning the levers in a particular position, as described above, fluid can be accessed from one bottom container and one back container simultaneously, allowing the cyclist to drink a mixture of the two fluids, i.e., a sports electrolyte drink diluted with water.

The contents of each of the containers can contain, for example, and without limitation, uncarbonated or carbonated fluid such as water, soft drinks, fruit drinks, sports drinks or electrolyte solution drinks. It is contemplated that the fluid-filled bottles placed in the containers of the present invention contain a volume of fluid ranging from about 15 to 30 ounces, preferably 20 ounces of fluid.

It is contemplated that the containers of the present invention have a diameter ranging from about 5.0 to 10.0 cm, preferably about 7.5 cm. It also is contemplated that the fluid-filled bottles have a diameter ranging from about 3.0 to 8.0 cm, preferably about 6.5 cm. Therefore, when one of the opened fluid-filled bottles is inverted and inserted into a container, there is a very tight fit, which essentially assures that no contamination of the bottle and/or container occurs. Additionally, because of the inverted position of the fluid-filled bottles, fluid flows from the bottles through the containers, tubing members and into the push-pull valve via gravity, thus not requiring a cyclist to have to suck on the push-pull valve in order to access the fluid therein.

The present invention provides a quantity of fluid heretofore not available to a cyclist at one time, allowing the cyclist to have access to hours of hydration before needing to replace one bottle. For example, and without limitation, an average cyclist may drink approximately 20 ounces of fluid per hour of cycling. Thus, the present invention allows for approximately four hours of cycling without the need for the cyclist to replace a bottle of fluid.

Figure 6:
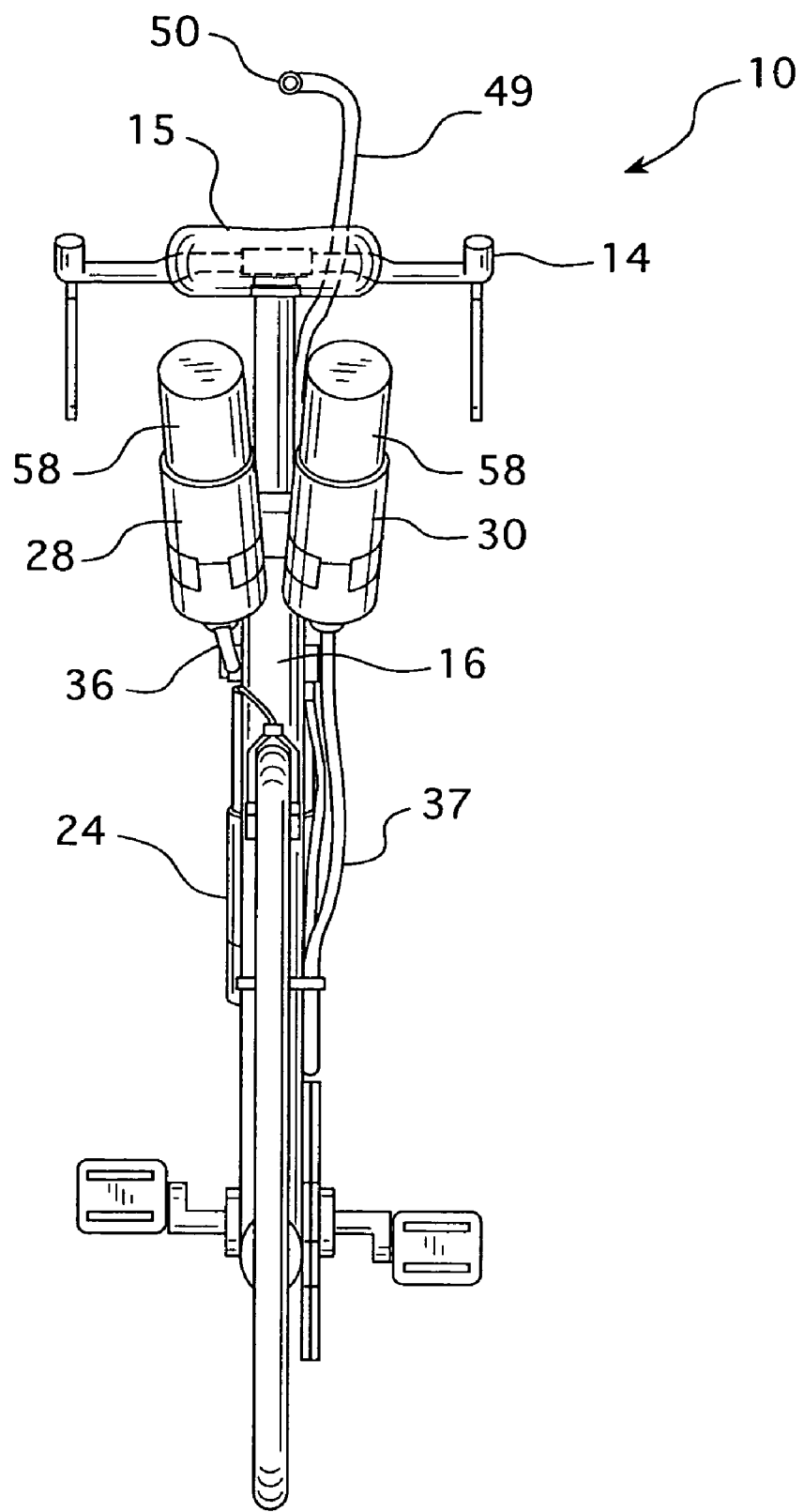
FIG. 6 is a rear elevational view of a bicycle showing two back containers behind the rear seat of a bicycle and showing only a portion of one of two bottom containers within the triangle of the frame of the bicycle.
Figure 7:
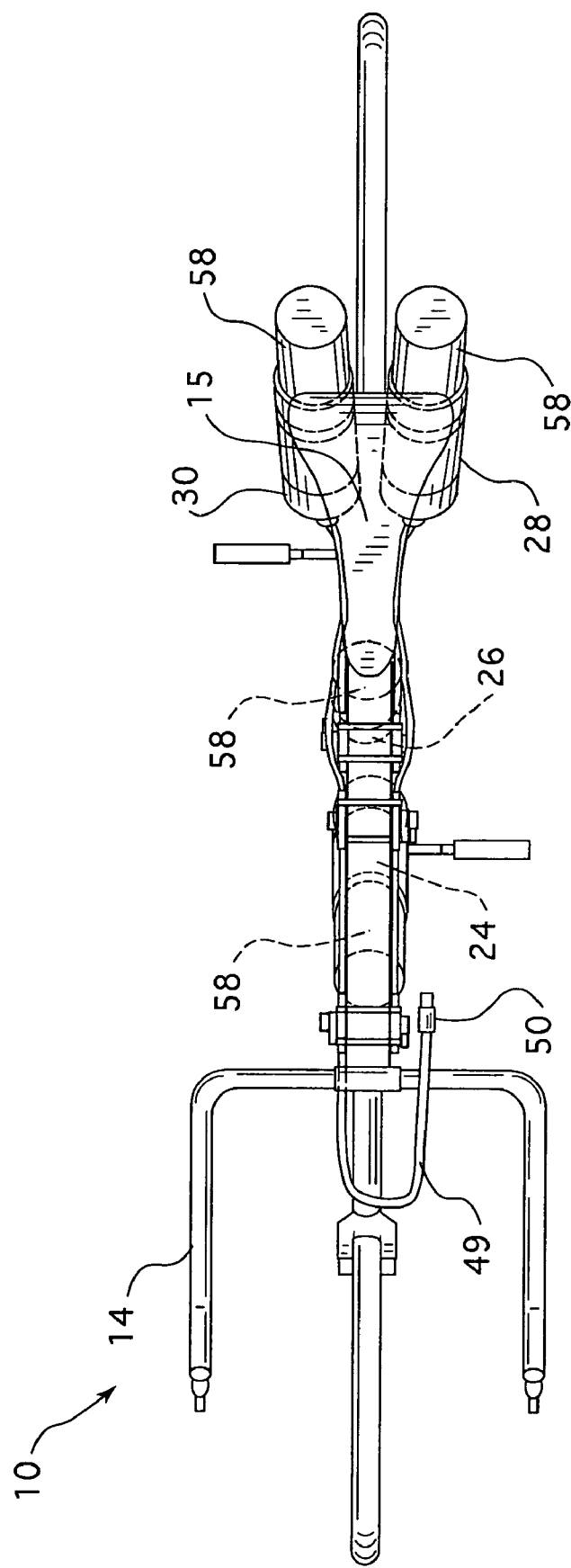
FIG. 7 is a top elevational view of a bicycle showing two back containers behind the rear seat of a bicycle and showing two bottom containers within the triangle of the frame of the bicycle.

Additionally, the position of the hydration system of the present invention is aerodynamically compatible with the horizontal posture of a cyclist during a cycling event. In particular, as shown in the rear elevational view depicted in FIG. 6, the two bottom containers are placed within the triangle frame 22 of the bicycle 10 so that they do not provide any wind drag while cycling (only shown is the first bottom container 24). The back containers also are aligned close to the contours of the bicycle 10 so that they also do not impede the aerodynamic posture of the bicyclist. Similarly, as shown in the top elevational view depicted in FIG. 7, the two bottom containers 24, 26 are well within the triangle frame 22 of the bicycle and the back containers 28, 30 are behind the seat 15 of the bicycle 10 so that the bottom containers 24, 26 virtually are not seen from this view and the back containers 28, 30 do not take up any additional lateral space, thus all four containers providing no impedance of air drag to the cyclist while cycling so as to maintain the aerodynamic posture of the bicyclist.

The present invention therefore provides heretofore unheard of versatility, flexibility and maneuveribility to a cyclist with respect to the selection of fluids the cyclist may access, the amount of fluid the cyclist may access, the lack of contamination of the fluids accessed, the ease of accessing the fluids, and maintaining aerodynamic posture, speed, cadence and endurance of the cyclist.

While the invention has been particularly shown and described with reference to preferred embodiments thereof, it will be understood by those skilled in the art that various alterations in form and detail may be made therein without departing from the spirit and scope of the invention.

The invention claimed is:

1. An athletic hydration system for cyclists, comprising:
   a first bottom container and a second bottom container, each of said first and second bottom containers having a first end and a second end, said first end defining an opening, and said second end having a sleeve-shaped outlet fitting port therein, wherein said first end of each of said first and second bottom container is capable of having inserted therein an open, inverted fluid-filled bottle;
   a first bottom container tubing member and a second bottom container tubing member, each of said first bottom container tubing member and said second bottom container tubing member having a first end and a second end, wherein said first end of said first bottom container tubing member inserts over said sleeve-shaped outlet fitting port of said first bottom container and said first end of said second bottom container tubing member inserts over said sleeve-shaped outlet fitting port of said second bottom container;
   a bottom container valve having at least two inlet ports and at least one outlet port, said bottom container valve having a rotatable lever, wherein said second end of said first bottom container tubing member inserts over one of said inlet port of said bottom valve and said second end of said second bottom container tubing member inserts over the other inlet port of said bottom valve, and wherein rotation of said lever to a particular position opens or closes the inlet and outlet ports of said bottom valve to allow fluid to flow from one or both inverted bottles in said first and second bottom containers through the tubing members;
   a first back container and a second back container, each of said first and second back containers having a first end and a second end, said first end defining an opening, and said second end having a sleeve-shaped outlet fitting port therein, wherein said first end of each of said first and second back container is capable of having inserted therein an open, inverted fluid-filled bottle;
   a first back container tubing member and a second back container tubing member, each of said first back container tubing member and second back container tubing member having a first end and a second end, wherein said first end of said first back container tubing member inserts over said sleeve-shaped outlet fitting port of said first back container and said first end of said second back container tubing member inserts over said sleeve-shaped outlet fitting port of said second back container;
   a back container valve having at least two inlet ports and at least one outlet port, said back container valve having a rotatable lever, wherein said second end of said first back container tubing member inserts over one of said inlet ports of said back valve and said second end of said second back container tubing member inserts over the other inlet port of said back valve, and wherein rotation of said lever to a particular position opens or closes the inlet and outlet ports of said back container valve to allow fluid to flow from one or both inverted bottles in said first and second back containers through the tubing members;
   a main valve having at least two inlet ports and at least one outlet port, said main valve having a rotatable lever which rotates in at least three positions to open or close the inlet and outlet ports of said main valve;
   at least two main valve inlet tubing members, each of said main valve inlet tubing members having a first end and a second end, wherein said first end of one valve inlet tubing member inserts over said inlet port of said main valve and said second end inserts in said bottom valve outlet port, and wherein said first end of another main valve inlet tubing member inserts over another inlet port of said main valve and said second end inserts in said back outlet port of said back valve; and
   a main valve outlet tubing member having a first end and a second end, said first end inserting over said outlet port of said main valve and said second end being positioned adjacent to the center of handlebars of a bicycle and terminating in a push-pull valve that inserts into the mouth of a cyclist, wherein rotation of said lever of said main valve to a particular position opens or closes one or both inlet ports and said outlet port of said main valve to allow fluid to flow from said bottom valve, said back valve, or from both bottom valve and back valve into said main three-way valve outlet tubing member.

2. The athletic hydration system for cyclists according to claim 1, wherein the bottom valve, back valve and main valve are three-way valves.

3. The athletic hydration system for cyclists according to claim 1, wherein rotation of said bottom container valve lever to a first position, rotation of said main valve lever to a first position, and pulling out the push-pull lever of said main valve outlet tubing allows a cyclist to drink fluid from said first bottom container by intaking fluid from the push-pull valve.

4. The athletic hydration system for cyclists according to claim 1, wherein rotation of said bottom valve lever to a second position, rotation of said main valve lever to said first position, and pulling out the push-pull lever of said main valve outlet tubing allows a cyclist to drink fluid from said second bottom container by intaking fluid from the push-pull valve.

5. The athletic hydration system for cyclists according to claim 1, wherein rotation of said bottom valve lever to a third position, rotation of said main valve lever to said first position, and pulling out the push-pull lever of said main valve outlet tubing allows a cyclist to drink fluid from said first bottom container and from said second bottom container simultaneously by intaking fluid from the push-pull valve.

6. The athletic hydration system for cyclists according to claim 1, wherein rotation of said back valve lever to a first position, rotation of said main valve lever to a second position, and pulling out the push-pull lever of said main valve outlet tubing allows a cyclist to drink fluid from said first back container by intaking fluid from the push-pull valve.

7. The athletic hydration system for cyclists according to claim 1, wherein rotation of said back valve lever to a second position, rotation of said main valve lever to said second position, and pulling out the push-pull lever of said main valve outlet tubing allows a cyclist to drink fluid from said second back container by intaking fluid from the push-pull valve.

8. The athletic hydration system for cyclists according to claim 1, wherein rotation of said back valve lever to a third position, rotation of said main valve lever to said second position, and pulling out the push-pull lever of said main valve outlet tubing allows a cyclist to drink fluid from said first back container and from said second back container simultaneously by intaking fluid from the push-pull valve.

9. The athletic hydration system for cyclists according to claim 1, wherein rotation of said bottom valve lever to a third position, rotation of said back valve lever to a third position, rotation of said main valve lever to a third position, and pulling out the push-pull lever of said main valve outlet tubing allows a cyclist to drink fluid from said first bottom container, said second bottom container, said first back container and said second back container simultaneously by intaking fluid from the end of the push-pull valve.

10. The athletic hydration system for cyclists according to claim 2, wherein each of said levers on said three-way valves rotates 180 degrees around an axis.

11. The athletic hydration system for cyclists according to claim 1, wherein said containers are cylindrically-shaped.

12. The athletic hydration system for cyclists according to claim 1, wherein said containers are fabricated from plastic.

13. The athletic hydration system for cyclists according to claim 1, wherein said tubing members are fabricated from plastic.

14. The athletic hydration system for cyclists according to claim 1, wherein gravitational force causes the fluid to flow from each of said inverted bottles through said tubing members.

15. The athletic hydration system for cyclists according to claim 1, wherein said main valve outlet tubing member is reinforced with an outer rubber sleeve.

16. The athletic hydration system for cyclists according to claim 1, wherein said containers have a diameter ranging from about 5.0 to 10.0 cm.

17. The athletic hydration system for cyclists according to claim 1, wherein said fluid-filled bottles have a diameter ranging from about 3.0 to 8.0 cm.

18. The athletic hydration system for cyclists according to claim 1, wherein said fluid-filled bottles contain a volume of fluid ranging from about 15 to 30 ounces.

19. The athletic hydration system for cyclists according to claim 1, wherein said fluid-filled bottles contain uncarbonated or carbonated fluid selected from the group consisting of water, soft drinks, fruit drinks, sports drinks and electrolyte solution drinks.

* * * * *

UNITED STATES PATENT AND TRADEMARK OFFICE
CERTIFICATE OF CORRECTION

PATENT NO. : 7,631,784 B2  Page 1 of 1
APPLICATION NO. : 11/446456
DATED : December 15, 2009
INVENTOR(S) : Todd Jonathan Hollis It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 866 days.

Signed and Sealed this

Second Day of November, 2010

David J. Kappos
*Director of the United States Patent and Trademark Office*